Feb. 18, 1969  S. R. PLANER  3,427,832
ELECTROMAGNETIC SAFETY LOCK FOR AUTOMOTIVE
VEHICLES AND THE LIKE
Filed Oct. 22, 1965  Sheet 1 of 2

INVENTOR.
SAMUEL R. PLANER,
BY
Berman, Davidson & Berman
ATTORNEYS.

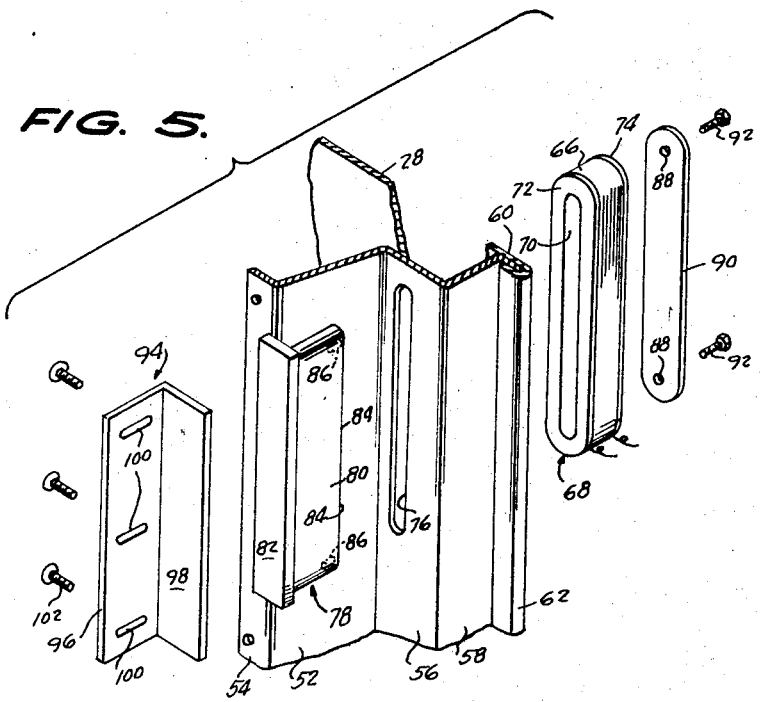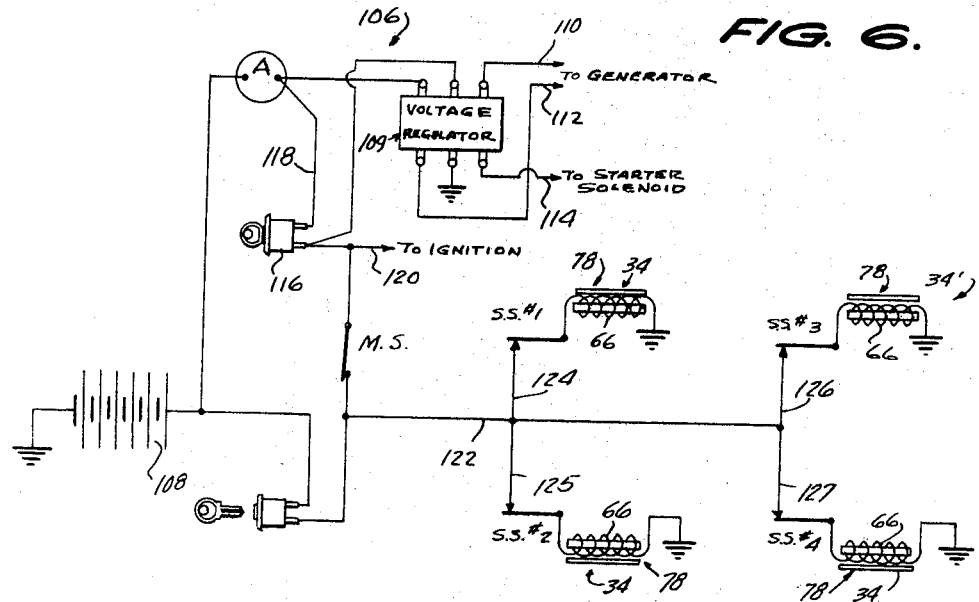

United States Patent Office 3,427,832
Patented Feb. 18, 1969

3,427,832
ELECTROMAGNETIC SAFETY LOCK FOR AUTOMOTIVE VEHICLES AND THE LIKE
Samuel R. Planer, P.O. Box 1493,
Gastonia, N.C. 28052
Filed Oct. 22, 1965, Ser. No. 502,211
U.S. Cl. 70—264
Int. Cl. E05b 63/14, 65/20; E05c 17/56
9 Claims

ABSTRACT OF THE DISCLOSURE

A safety lock for vehicle doors wherein each door carries a latch-bearing solenoid and each door jamb a member mating with such latch; a switch for disabling each solenoid; a master switch for disabling all of said solenoids; and a keylock type switch in parallel with all of said solenoids for simultaneously energizing all of said solenoids.

---

This invention relates to the general field of automobile door locking devices, and more specifically, the instant invention pertains to the provision of a safety locking mechanism for automobile doors which is operative to prevent the inadvertent or accidental opening thereof.

It is not at all unusual to read in any current newspaper or to learn from other news media of the death or serious injury to a person or persons riding in an automotive vehicle wherein personal injury and/or death was the direct consequence of the inadvertent or accidental opening of one or more of the doors to the vehicle permitting the driver and the passengers of the vehicle to fall or be thrown therefrom upon the road with attendant physical injury, or for such persons being run over by the vehicle in which they were riding or by other vehicles using the same road.

These injuries generally occur when the doors of the vehicle are improperly closed or when an occupant of the vehicle inadvertently or accidentally strikes the operating mechanism of the door in such a manner as to release the locking mechanism whereby the adjacent door, upon the application of but slight pressure, will move to its open position permitting the passenger or passengers to fall through the ingress and egress passageway.

While many attempts have been made in prior art devices to overcome this hazardous condition, no efficient locking means has been heretofore devised to obviate this potentially dangerous situation.

It is, therefore, one of the primary objects of this invention to provide safety locking means for an automobile or other types of vehicle doors which will positively lock the vehicle doors in their respective closed positions and to retain the same in their closed positions until such time that the safety locking means is deliberately rendered inoperative.

A further object of this invention is to provide a safety locking means for vehicle doors operatively-associated with the doors on opposite sides of the vehicle and which is rendered operative and inoperative by means independent of the conventional door-locking means of modern-day vehicles.

Another object of this invention is to provide a safety locking mechanism for automobile doors of the type generally described above, the safety locking means being of the electro-magnetic type and wherein the electromagnetic safety locking means is operable through control means inserted in the ignition circuit of the automobile.

The present invention has, as a still further object thereof, the provision of vehicle operator selectively operable switches to over-ride the control means inserted in the ignition circuit to provide selective de-energization of the electro-magnetic safety locking means for any given door or of all of the doors simultaneously.

Yet another object of the invention is to provide exterior locking means also by-passing the ignition circuit switch control means aforesaid, these control by-pass means being readily available to the operator with or without concealment.

This invention contemplates, as a still further object thereof, the provision of an electromagnetic locking mechanism for the doors of automotive vehicles and the like, the lock being non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 5 is an exploded perspective view of the electromagnetic safety locking means; and FIGURE 6 is a schematic wiring diagram illustrating the electrical circuits to the electromagnetic safety locking means.

Figure 1:
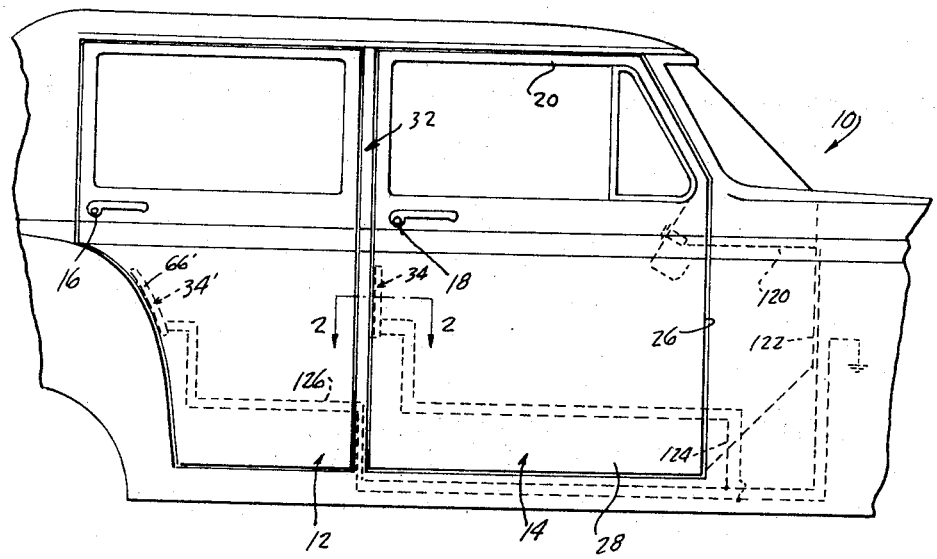
FIGURE 1 is a fragmentary side elevational view of a conventional automotive vehicle together with a showing of the electromagnetic safety locking mechanism for the several doors thereof.

Referring now more specifically to the drawings, reference numeral 10 designates, in general, a conventional four-door automotive vehicle including the pairs of back and front hingedly-connected doors 12, 14 for each side of the vehicle (only one pair of doors being shown), the positions as shown in FIGURE 1 by the usual locking means actuated from the exterior by the push-button control means 16, 18 and by other means (not shown) in the interior of the vehicle.

doors 12, 14 being normally held in their respective closed The doors 12, 14 each includes the customary top and bottom rails 20, 22, the oppositely-disposed side frame members 24, 26 of which the side frame member 24 is normally free, and the front and back panels 28, 30. The free side frame member 24 confronts the usual upright door jamb 32, and the more detailed construction of these two component elements of the vehicle 10 will be more fully set forth below.

Reference numerals 34, 34' denote electromagnetic safety door locks for the front and back doors 14, 12, respectively, and since each lock is a substantial duplicate of the other, only the mechanism of the lock 34 will be specifically described herein with respect to its association with component elements of the vehicle in order to provide a full and complete understanding of the nature and function of the safety locking mechanism.

Figure 2:
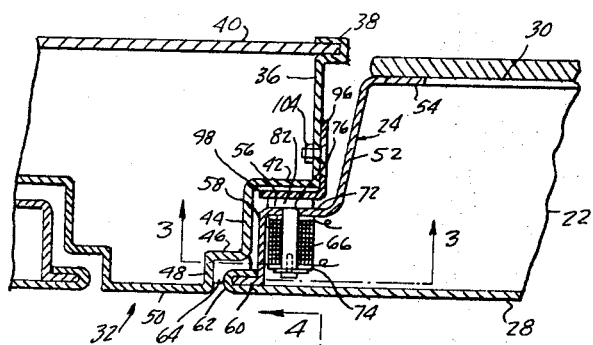
FIGURE 2 is an enlarged fragmentary detail cross-sectional view, FIGURE 2 being taken substantially on the horizontal plane of line 2—2 of FIGURE 1, looking in the direction of the arrows.
Figure 4:
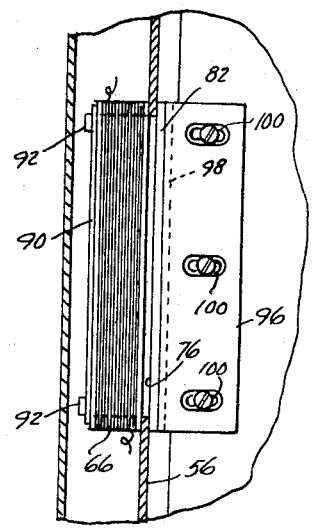
FIGURE 4 is a fragmentary detail cross-sectional view, FIGURE 4 being taken substanutially on the vertical plane of line 4—4 of FIGURE 3, looking in the direction of the arrows.
Figure 3:
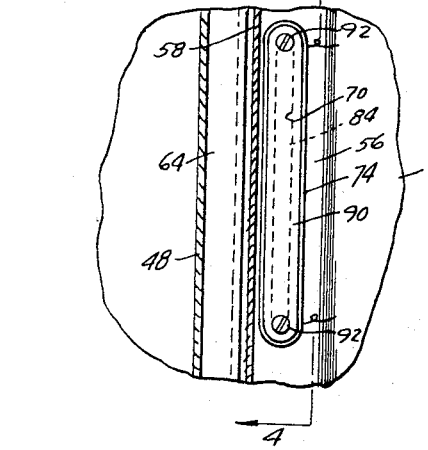
FIGURE 3 is a detail cross-sectional view, FIGURE 3 being taken on the line 3—3 of FIGURE 2, looking in the direction of the arrows.

Before treating the specifics of the safety lock mechanism 34 it should be noted that the door jamb 32 includes an elongated substantially flat rectangular inwardly-disposed main body portion 36 having its inner side reverted as at 38 to accept the longitudinally-extending marginal edges of a closure panel 40. The outer edge of the main body portion 36 is bent toward the rear of the vehicle 10 to form an upright substantially rectangular shoulder 42 disposed at right angles relative to the main body portion 36. As is seen in FIGURE 2, the inner end of the shoulder 42 is bent laterally toward the adjacent outer side of the vehicle 10 to form an upright strut 44 disposed at right angles with respect to the shoulder 42. The outer end of the strut 44 is bent rearwardly with respect to the vehicle 10 to form an upright stop flange 46. The outer end of the stop flange 46 is bent outwardly toward the adjacent outer side of the vehicle 10 to form the upright substantially rectangular sealing flange 48 disposed at right angles with respect to the stop flange 46, and the outer end of the sealing flange 48 is bent laterally toward the rear of the vehicle 10 at right angles relative to the stop flange 46, to form the upright base plate 50 of the jamb 32. The door jamb 32 is thus seen to include a stepped side normally confronting the side frame member 24 which is stepped in a complementary manner in that it is formed with an upright substantially flat rectangular main body portion 52 having a longitudinally-extending side edge 54 bent forwardly of the vehicle 10 to form a support for the panel 38. The main body portion 52 extends from the support 54 toward the outer panel 37 at an acute angle with respect to the main body portion 36 of the jamb 32 and in laterally-spaced relation relative thereto. The other end of the main body portion 52 is bent rearwardly with respect to the vehicle 10 to form a substantially rectangular upright shoulder 56 which is disposed in laterally-spaced and substantially parallel relationship relative to the upright shoulder 42. As is seen in FIGURE 2, the outer end of the shoulder 56 is bent laterally toward the panel 28 and at right angles with respect to the shoulder 56 to form the upright substantially rectangular strut 58 disposed in laterally-spaced and substantially parallel relation with respect to the strut 44. The outer end of the strut 58 is bent at right angles to form a substantially rectangular upright stop flange 60 disposed in laterally-spaced and substantially parallel relation with respect to the stop flange 46. The outer end of the stop flange 60 is embraced by the upright reverted end 62 of the outer door panel 28, the reverted end 62 being disposed in laterally-spaced and confronting relationship with respect to the sealing flange 48.

In the corner formed at the junction of the stop flange 46 and the sealing flange 48 there is disposed the conventional substantially L-shaped sealing and abutment strip 64. The strip 64 is adapted to receive and seal about the reverted end 62 of the panel 28, all in the conventional manner, when the door 14 is pivoted to its closed position shown in FIGURES 1 and 2.

The electromagnetic safety lock 34, to which this invention pertains, is seen to comprise a vertically-elongated oval-shaped hollow electrical winding 66 carried on an oval-shaped form 68. As is seen in FIGURE 5 of the drawings, the form 68 includes a substantially hollow oval-shaped throat 70 which supports the winding 66, the winding 66 being restrained against inadvertent or accidental displacement from either end of the throat 70 by means of the continuous flanges 72, 74 which project laterally and outwardly from the throat 70. The winding 66, together with its support form 68 is inserted within the front door 14 between the shoulder 56 and the panel 28, the winding 66 and its form 68 being disposed immediately adjacent the strut 58. The winding 66 is normally disposed below the conventional automobile door lock and its actuating means and is positioned in such a manner that the flange 72 abuts against the shoulder 56. The shoulder 56 is formed with a vertically-extending slot 76, and the throat 70 is disposed in alignment therewith.

Reference numeral 78 indicates a substantially T-shaped core formed of any suitable ferrous material, the core 78 including a vertically-elongated oval-shaped stem 80 which is integrally-connected substantially centrally of a vertically-extending substantially rectangular crosshead 82. The T-shaped core has the stem portion thereof passed transversely through the slot 76 and the throat 70, the length of the stem being such as to extend substantially flush with the outer side of the flange 74. As is seen in the drawings, the outer side 84 of the stem 80 is formed with a pair of vertically-spaced tapped openings 86 which are aligned with openings 88 which extend transversely through a vertically-elongated oval-shaped back plate 90 in longitudinally-spaced relation with respect thereto. Screws 92 extend through the openings 88 of the back plate 90 and are threaded into the tapped openings 86 and are tightened therein to securely clamp the crosshead 82 to the outer side of the shoulder 56 and the winding 66 together with its form 68 against the inner side thereof.

Reference numeral 94 designates, in general, a substantially L-shaped armature which includes a leg portion 96 and a foot portion 98. As is seen in FIGURE 5 of the drawings, the leg portion 96 is formed with a plurality of horizontally-elongated vertically-spaced slots 100. The leg portion 96 is disposed in face-to-face contact with the main body portion 36 of the jamb 32 and extends parallel thereto. The foot portion 98 is disposed in confronting relationship relative to the shoulder 42, and is held in laterally-spaced and substantially parallel adjusted relation relative thereto by means of the adjusting screws 102 which pass through the horizontally-disposed slots 100 formed in the leg 96. Nuts 104 serve to cooperate with the screws 102 to clamp the leg 96 securely against the adjacent side of the main body portion 36 of the jamb 32.

Reference is now made to FIGURE 6 of the drawings wherein a conventional automobile ignition circuit is schematically shown in conjunction with the windings or coils 66 of the electromagnetic locks 20, 20'. The ignition circuit is generally designated by reference numeral 106 and includes the usual battery 108 connected in series with the ammeter A and a voltage regulator 109, all in the conventional manner. Leads 110, 112 run from the voltage regulator to the generator, and a lead 114 connects with one side of the conventional starter solenoid, the generator and starter solenoid being omitted from this figure. One side of a key-controlled ignition switch 116 is connected via wire 118 with the ammeter A while the other side of the switch 116 is connected through wire 120 to the ignition.

The vehicle 10 is here presumed to be a four-door sedan wherein the front door electromagnetic locks 34 are identified in FIGURE 6 by the numerals 34L and 34R indicating the locks at the left and right sides at the front of the vehicle 10 and by 34′L, 34′R indicating identical locks on the left and right-hand sides at the rear of the vehicle.

As is seen in FIGURE 6, the safety locks 34L, 34′L are connected in parallel in the ignition circuit through the wires 124, 126 and that the safety locks 34R, 34′R are similarly connected through the wires 125, 127, respectively. Connected in the wires 124, 125 are the normally closed selectively-operable normally closed switches S.S.#1, S.S.#2 and connected in the wires 126, 127 are the selectively-operable switches S.S.#3, S.S.#4, respectively. The circuitry also includes a manually-operable normally closed meter switch, M.S. connected in the wire 122. The switches S.S.#1, S.S.#2, S.S.#3, S.S.#4 and M.S. are all mounted on the dashboard of the vehicle 10 within convenient reach of the vehicle operator.

The electrical control circuits include a normally open shunt or by-pass switch 127 of the key-actuated type which may be door mounted or mounted on the vehicle in a concealed position if desired. Thus, with the switches in their above-named closed or open normal positions, whenever the key-operated ignition switch 116 is turned to its motor-starting and ignition position, the windings 66 of each of the electromagnetic safety locks 34, 34′ will be energized and, assuming the doors of the vehicle are in their respective closed positions, the electromagnetic windings will exert a holding force on the armature 94 which prevents the same from pivoting on its hinge connections to move to their open positions.

Whenever the ignition to the motor is cut off through the operation of the switch 116, the coils 34, 34' become instantly de-energized whereby the doors 12, 14, on each side of the vehicle 10 may be opened and closed in the usual manner.

With the ignition circuit energized the operator may selectively de-energize any of windings 66 through the manual operation of any one or a combination of the switches S.S.#1, S.S.#2, S.S.#3, or S.S.#4 or all of them through the dashboard-mounted master switch M.S. to permit the loading or discharge of passengers through any one or all of the vehicle doors upon actuation of the conventional door-locking mechanisms. This is accomplished without the de-energization of the ignition circuit.

The windings may also be energized after the operator has vacated the vehicle 10 through the moving of the shunt or by-pass switch 127 to its closed position. This has the added advantage of making burglary of the vehicle 10 more difficult, especially if the switch 127 is concealed.

Referring again to FIGURE 1 of the drawings, it is seen that the electromagnetic winding for the electromagnetic safety switch 34' connected to the rear door 14 of the vehicle 10 is concave-convex, the winding 66' taking this configuration in order to complement the adjacent side frame member of the rear door. It will be necessary for the armature (not shown) to take a similar configuration.

Having described and illustrated two embodiments of this invention in detail, it will be understood that the same are offered merely by way of example.

What is claimed is:
1. In combination with an automotive vehicle having a door provided with laterally-spaced front and back panels, means hingedly-connecting one side of said door on said vehicle, an upright free side frame member oppositely-disposed with respect to the hingedly-connected side of said door, said free side frame member being disposed between and being fixedly-secured to said panels at a pair of adjacent ends thereof at the other side of said door, a fixed upright door jamb, said free side frame member confronting said jamb when said door is in its normally closed position, an ignition circuit for said vehicle and electromagnetic safety locking means for said door, said electromagentic locking means comprising an elongated substantially flat armature formed of magnetizable material, means securing said armature on said door jamb in confronting relation relative to said free side frame member, said free side frame member having an upright elongated slot formed therein and extending transversely therethrough, an electromagnetic comprising a substantially hollow elongated winding disposed between said panels adjacent one side of said free side frame member and said slot formed therein, a core for said winding, said core being formed of a magnetizable material and having a substantially D-shaped configuration including an elongated stem and a crosshead connected to an end of said stem and extending on opposite sides thereof, said core having its other end extending through said slot and into said winding with said crosshead spanning said slot and being superimposed against the other side of said free side frame member with said crosshead confronting said armature, and means clamping said crosshead and said core on said free side frame member, said winding being adapted for connection in said ignition system for substantially simultaneous energization therewith.

2. In the combination of claim 1, wherein said door jamb and free side frame member each includes an upright main body portion and an upright shoulder offset with respect thereto with said shoulders being disposed in laterally-spaced and parallel relation relative to one another, and wherein said armature comprises an L-shaped element having connected leg and foot portions. said foot portion being disposed in confronting relation relative to said crosshead, and means adjustably connecting said leg portion to said main body portion whereby said foot portion may be adjusted toward and away from said crosshead.

3. In the combination recited in claim 2, and said electromagnet including an oval form having an elongated hollow throat provided with a pair of opposed ends, a continuous flange projecting laterally and outwardly from each end, respectively, of said throat, said winding being wound on said throat between said flanges, and said stem being received within said throat.

4. In the combination of claim 3, and a substantially flat elongated back plate extending across the exposed end of said stem and adjacent portions of said throat and the flange immediately adjacent thereto, and a plurality of screws extending transversely through said back plate and threadedly-engaging said exposed side of said stem whereby said crosshead and said electromagnet are clampingly-secured to said side frame member.

5. In the combination recited in claim 4, wherein said ignition circuit is interrupted by a key-controlled switch.

6. In the combination recited in claim 5, wherein said vehicle is provided with a plurality of doors, each of said doors being provided with, respectively, an electromagnetic safety lock and wherein the windings of each magnet of each of said safety locks is connected in parallel with said ignition circuit.

7. In the combination recited in claim 6. wherein a normally closed switch is connected, respectively, in said parallel circuits ahead of each winding.

8. In the combination recited in claim 7, wherein a normally closed master switch is connected in said circuit ahead of said parallel circuitry.

9. In the combination recited in claim 8, and a normally open shunt switch connected across said ignition switch.

References Cited
UNITED STATES PATENTS

| | | | |
|---|---|---|---|
| 2,506,851 | 5/1950 | Ayers | 70—264 |
| 2,802,358 | 8/1957 | Cash | 70—283 |
| 2,673,108 | 10/1950 | Roller | 292—144 |

MARVIN A. CHAMPION, *Primary Examiner.*

ROBERT L. WOLFE, *Assistant Examiner.*